Oct. 8, 1963
W. R. JOHNSON
3,106,688
TRANSFORMER COUPLING SYSTEM EFFECTIVE OVER A WIDE FREQUENCY RANGE
Filed Feb. 20, 1961
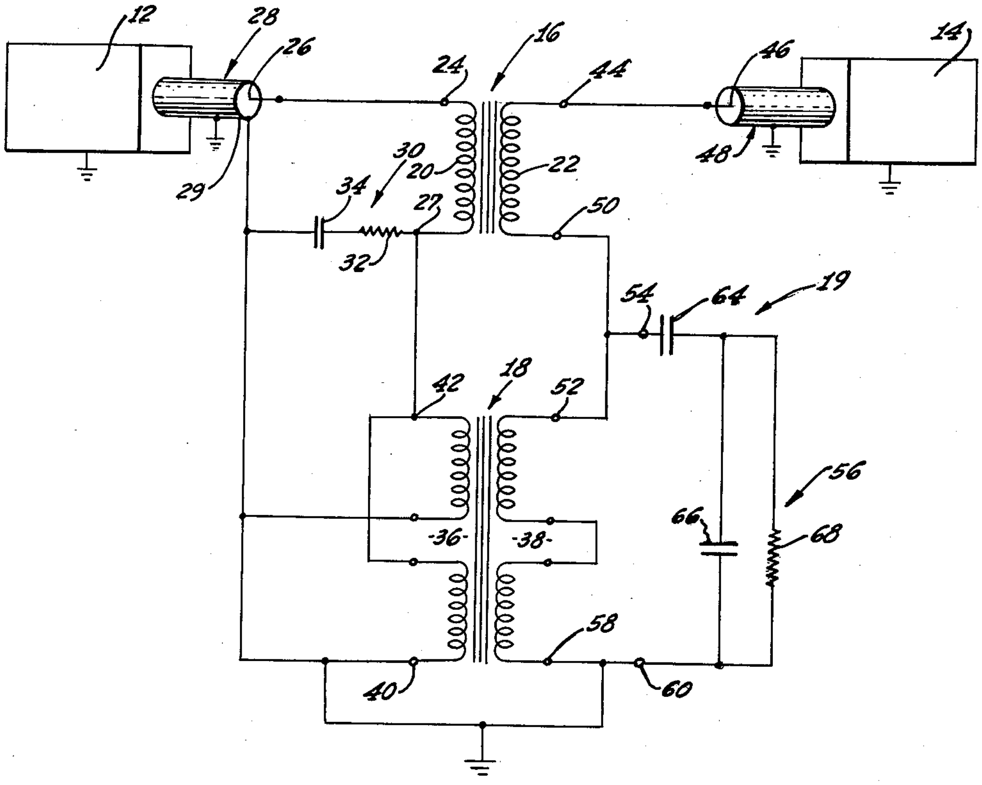
INVENTOR:
Wayne R. Johnson
By Smyth, Roston & Pavitt
Attorneys 3,106,688

TRANSFORMER COUPLING SYSTEM EFFECTIVE OVER A WIDE FREQUENCY RANGE

Wayne R. Johnson, Los Angeles, Calif., assignor to Minnesota Mining and Manufacturing Company, St. Paul, Minn., a corporation of Delaware Filed Feb. 20, 1961, Ser. No. 90,454
3 Claims. (Cl. 333—28)

The present invention relates to impedance matching means for electrically interconnecting an output of one device with the input of a succeeding device and more particularly to means for matching the impedance of such an output to such an input over a wide band of frequencies. The invention is especially adapted to be used when the input impedance is relatively low and the output impedance is relatively high over the wide band of frequencies such as occurs when television signals are being reproduced.

In order to obtain an efficient transfer of signals between electronic devices it is necessary for the impedance of the inputs and the outputs thereof to be matched. In the event there is a substantial difference between the input and output impedances, suitable impedance matching means may be employed. Although such impedance matching means may comprise a wide variety of impedance matching networks and devices, it has been found that a transformer provides the desired impedance matching with a minimum amount of distortion and noise.

Although transformers provide excellent impedance matching, the characteristics of the transformers vary with the frequencies of the signals supplied because of their inductive nature. As a result, the impedance matching ability of a transformer is limited to a relatively narrow band of frequencies. Thus, in those applications where the signals cover a wide range of frequencies, a transformer has been incapable of providing the required impedance matching with a satisfactory degree of uniformity over the entire band width. Therefore, in order to provide impedance matching means having a wide band width, electrical circuitry employing one or more vacuum tubes, transistors or similar devices has been used. Unfortunately, such devices not only have a certain amount of inherent noise in them that is added to the original signal, but they are also effective to produce a certain amount of distortion in the signals.

It is now proposed to overcome the foregoing difficulties by providing impedance matching means that will be capable of matching the impedance of an output to input over a wide range of frequencies without materially distorting the signals or adding any noise thereto. More particularly, the present invention includes impedance matching means having a plurality of transformers that are arranged to form complementary paths for the signals in different portions of the band width. The invention is especially adapted to provide an impedance match between an input impedance having a low value and an output impedance having a high value such as occurs in the reproduction of television signals.

In accordance with the present invention, one transformer may be provided that will produce the required impedance matching throughout one portion of the band width and a second transformer may be provided that will produce the required impedance matching throughout another portion of the band width. For example, one of the transformers may be of the so-called video variety wherein the transformer operates uniformly over a wide band of high frequency while the other transformer is of the so-called audio variety wherein the transformer operates uniformly over a wide band of low frequencies. Transition circuit means are provided that will insure each of the transformers receiving the signals of the frequencies within its operational band width. In addition, the transition circuit means will insure that the signals in the transition area between said bands will also be properly matched with a minimum amount of phase shifting or distortion.

In one embodiment of the invention, a transducer head having a relatively low impedance is disposed relative to a storage medium such as a tape to reproduce signals previously recorded in the tape. When the signals represent video and sound such as for television, the signals have a relatively wide range of frequencies such as 0 to 4 megacycles. The primary winding of a video transformer is connected to receive the television signals and is in series with the primary winding of an audio transformer. An integrating circuit formed from a combination of resistors and capacitors is connected across the secondary winding of the audio transformer to increase the effective impedance of the audio transformer at the relatively low frequencies. The integrating circuit is also instrumental in producing a transition in the intermediate frequencies between the control provided by the audio transformer at the low frequencies and the video transformer at the high frequencies. Means including the integrating circuit are also included in the invention to bypass the audio transformer at the high frequencies since the audio transformer would have an excessive impedance at such frequencies.

In the single FIGURE, a wiring diagram of impedance matching means embodying one form of the present invention is shown.

Referring to the drawing in detail, the present invention is embodied in impedance matching means 10 for electrically interconnecting the output of a first electronic device such as a magnetic tape pick-up head 12 to the input of a second electronic device such as a pre-amplifier 14 so as to match the input-output impedances over a very wide band of frequencies.

The pick-up head 12 is particularly adapted to operate over an extremely wide frequency band width such as required for the recording of television signals including the audio and video portions of the signals. The head 12 is provided with a low impedance, for example, in the order of approximately 60 ohms. However, a preamplifier 14, suitable for amplifying such signals, will normally have a relatively high input impedance. Accordingly, in order to obtain the efficient transfer of signals from the pickup head 12 to the preamplifier 14, it is necessary for the impedance matching means 10 to match the low output impedance from the head to the high input impedance of the preamplifier 14 throughout the entire band width of the signals recorded on the tape.

To accompish this, the impedance matching means 10 includes a pair of impedance matching means such as transformers 16 and 18 that are interconnected with each other by transition circuit means 19 to form a plurality of complementary paths for the signals to follow. Both of the impedance matching means such as the transformers 16 and 18 have inductive reactances which increase with increases in frequency. Each of the transformers 16 and 18 is provided with characteristics to match the impedance of the head 10 to the impedance of the preamplifier 14 in a particular range of frequencies.

The first transformer 16, which is preferably of the so-called video variety, is particularly adapted to operate substantially uniformly over a wide range of high frequencies and to match the impedance of the head 12 to the impedance of the preamplifier 14 at such high frequencies. The ratio between the number of turns in the primary winding 20 and the secondary winding 22 and the other operating parameters of the transformer 16 are particularly adapted to provide the desired matching of the output-to-input impedances with a high degree of linearity from approximately 100 kc. into the megacycle range or to the upper limit of the signals produced by the pickup head 12.

One side 24 of the primary winding 20 is connected to a center conductor 26 of a coaxial transmission line 28 having the opposite end thereof connected to the pickup head 12. The other side 27 of the primary 20 is connected to the outer conductor 29 of the coaxial line 28 by means of a by-pass portion 30 of the transition means 19. This by-pass portion 30 includes a resistance 32 and a capacitance 34 which are arranged to present a low impedance to the signals in the high frequency band where the transformer 16 is most effective, i.e. above 100 kc. The coaxial line 28 may be provided with a suitable impedance such as 60 ohms to match the impedance of the head 12 and the outer conductor 29 of the coaxial line may be connected to a suitable reference potential such as ground.

It may thus be seen that all of the signals from the pickup head 12 will circulate through the primary winding 20, but, due to the inherent characteristics of the transformer 16, only the signals in the high frequency band will be coupled into the secondary winding 22. As the frequencies of the signals from the pickup head 12 decrease below this band, the impedance of the primary winding 20 will decrease and the impedance of the by-pass circuit 30 will increase toward infinity as the signal frequency approaches zero. Thus, the signals in the lower band will appear primarily across the by-pass circuit 30.

The second transformer 18, which is preferably of the so-called audio variety, is particularly adapted to operate substantially uniformly over a wide band of frequencies. The ratio between the number of turns in the primary winding 36 and the secondary winding 38 and the other operating parameters of the transformer 18 are particularly adapted to provide the desired matching of the input-to-output impedances with a high degree of linearity at relatively low frequencies.

One side 40 of the primary winding 36 is connected to the outer conductor 29 of the coaxial line 28. The other side 42 is connected to the side 27 of the primary winding 20. It may thus be seen that the primary winding 36 will be connected across the by-pass circuit 30 and the signals appearing in the primary winding 36 will be substantially identical to those appearing across the by-pass circuit 30. As a result, the amplitude of the signals appearing in the primary winding 36 will be determined primarily by the impedance of the resistor 32 and the capacitor 34 relative to the impedance of the primary winding 20. Therefore, at the higher frequencies the signals in the primary 36 will be very small, i.e. they will be shorted through the by-pass circuit 30. However, the impedance of the condenser 34 will be very large to the low frequency signals. Accordingly, the signals in the lower frequency band will appear in the primary winding 36. As a result, the relative amplitude of the signals in the winding 36 will increase as the frequency decreases and the lower frequency signals will gradually become more predominate in the lower frequency transformer 18.

The secondary winding 22 of the first transformer 16 has one end 44 thereof connected to the center conductor 46 of a coaxial cable 48 leading to the input of the preamplifier 14. The opposite side 50 of the secondary winding 22 is connected to one end 52 of the secondary winding 38 of the transformer 18 and one end 54 of an integrating circuit portion 56 of the transition means 19. The opposite ends 58 and 60 of the secondary winding 38 and the integrating circuit 56 are connected to a suitable reference potential such as ground, as is the outer conductor 48 of the coaxial transmission 48.

The integrating circuit 56 has a capacitive reactance and includes a condenser 64 which is in series with a parallel combination of condenser 66 and a resistor 68. These elements 64, 66 and 68 are arranged to start integrating the signals at approximately the effective lower frequency limit of the transformer 18. As the frequencies of the signals increase, the effectiveness of the integrating action will gradually decrease. However, as the frequency of the signals increases into the effective range of the high frequency transformer 16, the condensers 64 and 66 will form a very low impedance path that will virtually short out the secondary winding 38. It has been found that if condenser 64 has a capacitance of .033 microfarad, condenser 66 has a capacitance of 1000 micromicrofarads and the resistor 68 a resistance of 1200 ohms, the circuit 56 will integrate effectively over a range of from about 200 cycles per second to about 100 kilocycles per second with a minimum amount of phase shifting. By providing an integration at the relatively low frequencies, the circuit 56 effectively increases the impedance of the transformer 18.

In the operation of the present impedance matching means 10, the pickup head 12 may sense the magnetic recordings on a tape and produce electrical signals corresponding thereto. These signals will then be fed into the coaxial cable 28 and appear between the conductors 26 and 29. The signals will then circulate through the primary winding 20 and the parallel arrangement of the primary winding 36 and the by-pass circuit 30. The high frequency portions of the signals will pass through the primary winding 20 and be coupled into the secondary winding 22. This portion of the signals will be shorted to ground by the by-pass circuit 30 so that little or none of the signals will pass into the primary winding 36. Also these signals will be shorted to ground by the condensers 64 and 66. Thus the only means by which any material amount of the high frequency signals can get into the secondary circuits is by means of the transformer 16.

Although the lower frequency portions of the signals will flow through the primary winding 20, due to the inherent characteristics of a high frequency transformer little or none of these low frequency signals can be coupled into the secondary winding 22. However, due to the high impedance presented by the by-pass circuit 30 and the low impedance presented by the primary winding 36, the lower frequency signals will be diverted into the primary winding 36 and coupled into the secondary winding 38.

It may thus be seen that although the two transformers 16 and 18 may each operate uniformly over a large portion of the band width of the impedance matching means 10, there will still be a proper impedance matching of the signals having frequencies in the middle portions of the band, due to the action of the integrating means 19. First of all the by-pass portion 30 will insure a proper dimension of the signals between the two primaries 16 and 18. In addition the integrating portion 56 will be effective to at least partially integrate the signals in the middle portions of the band width. It may therefore be seen that the impedance matching means 10 will be effective to match input-output impedances over an extremely wide band width with a minimum amount of distortion or phase shifting.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use in apparatus for reproducing information from a storage medium as represented by signals having a wide range of frequencies and for introducing such signals to a stage having a first particular impedance, a head constructed to provide a transducing action between signals in the head and information in the storage medium and provided with a second particular impedance different from the first particular impedance, a first transformer having a primary winding and a secondary winding and provided with characteristics to respond to signals at the high frequencies in the range and to provide an impedance match between the first and second particular impedances at the high frequencies, a second transformer having a primary winding and a secondary winding and provided with characteristics to respond to signals at the low frequencies in the range and to provide an impedance match between the first and second particular impedances at the low frequencies, means connected in a circuit with the head and the primary windings of the first and second transformers to provide for the passage of the signals at the high frequencies through the first transformer and for the passage of the signals at the low frequencies through the second transformer and to provide for a by-pass of the signals at the high frequencies from the primary winding of the second transformer to inhibit the passage of the signals at the high frequencies through the second transformer, and means connected in a circuit with the secondary windings of the first and second transformers to provide an integration of the signals at low frequencies for a boost of such signals and to provide a by-pass of the signals at the high frequencies from the secondary winding of the second transformer to inhibit the passage of the signals at the high frequencies through the secondary winding of the second transformer.

2. Wide band impedance matching means for coupling the output of a signal source having a low output impedance to the input of a signal utilizing device having a high input impedance so as to match the output and input impedances to each other over an extended range of frequencies, said impedance matching means comprising the combination of:

a first high frequency impedance matching transformer having a primary winding and a secondary winding, said windings being coupled to each other and having characteristics effective to match said output impedance to said input impedance over at least the higher frequency portions of said extended frequency range, a second low frequency impedance matching transformer having at least one primary winding and at least one secondary winding, said primary winding and said secondary winding being coupled to each other and having characteristics effective to match said output impedance to said input impedance over at least the higher frequency portions of said extended frequency range, means for directly connecting the first side of said first primary winding with a first side of said output, a bypass circuit interconnecting the second side of said first primary winding with the second side of said output so that said first primary winding and said bypass circuit are disposed in series with each other and with the output of said signal source so that all of the current in the signals from said output will flow through the first primary, said bypass circuit having an impedance in said high frequency portion of said frequency range that is small compared to the impedance of the primary winding in said high frequency transformer so that little, if any, voltage will be present across said bypass circuit from signals having frequencies in said high portion and substantially all of the voltage from signals in said high frequency portion will be present across said first primary winding, said bypass circuit having an impedance in said low frequency portion of said extended frequency range that is large compared to the impedance of the primary winding in said high frequency transformer so that little, if any, voltage will be present across said primary winding from signals having frequencies in said low portion so that substantially all of the voltage from said low frequency signals will be present across said bypass circuit and very little, if any, currents at said low frequency may flow through said bypass circuit, said primary winding in said low frequency transformer having one side connected directly to the second side of said first primary winding and to the second side of said output so as to be directly in series with said first primary winding and in parallel to said bypass circuit so that signals having frequencies in said low frequency portion will circulate in said second primary, said first secondary windings having one side connected to the first side of said input, said second secondary winding having one side connected to the second side of said input, the remaining sides of said secondaries being joined together so that said secondaries will be in series across said input.

3. Wide band impedance matching means for coupling the output of a signal source having a low output impedance to the input of a signal utilizing device having a high input impedance so as to match the output and input impedances to each other over an extended range of frequencies, said impedance matching means comprising the combination of:

a first high frequency impedance matching transformer having a primary winding and a secondary winding, said windings being coupled to each other and having characteristics effective to match said output impedance to said input impedance over at least the higher frequency portions of said extended frequency range, a second low frequency impedance matching transformer having at least one primary winding and at least one secondary winding, said primary winding and said secondary winding being coupled to each other and having characteristics effective to match said output impedance to said input impedance over at least the higher frequency portions of said extended frequency range, means for directly connecting the first side of said first primary winding with a first side of said output, a bypass circuit interconnecting the second side of said first primary winding with the second side of said output so that said first primary winding and said bypass circuit are disposed in series with each other and with the output of said signal source so that all of the current in the signals from said output will flow through the first primary, said bypass circuit having an impedance in said high frequency portion of said frequency range that is small compared to the impedance of the primary winding in said high frequency transformer so that little, if any, voltage will be present across said bypass circuit from signals having frequencies in said high portion and substantially all of the voltage from signals in said high frequency portion will be present across said first primary winding, said bypass circuit having an impedance in said low frequency portion of said extended frequency range that is large compared to the impedance of the primary winding in said high frequency transformer so that little, if any, voltage will be present across said primary winding from signals having frequencies in said low portion so that substantially all of the voltage from said low frequency signals will be present across said bypass circuit and very little, if any, currents at said low frequency may flow through said bypass circuit, said primary winding in said low frequency transformer having one side connected directly to the second side of said first primary winding and to the second side of said output so as to be directly in series with said first primary winding and in parallel to said bypass circuit so that signals having frequencies in said low frequency portion will circulate in said second primary.

said first secondary windings having one side connected to the first side of said input, said second secondary winding having one side connected to the second side of said input, the remaining sides of said secondaries being joined together so that said secondaries will be in series across said input, an integrating circuit connected between the junction of said secondaries and the second side of said input so as to be in parallel to said second secondary, said integrating circuit including a capacitive reactance in parallel with a resistor and in series with a second capacitive reactance so as to be effective to integrate signals in the lower frequency portions for boosting such signals and to provide a bypass of the signals in the high frequency portions to inhibit the passage of signals in the high frequency portions passing through the secondary winding.

References Cited in the file of this patent

UNITED STATES PATENTS

| | | |
|---|---|---|
| 1,767,951 | Whittle | June 24, 1930 |
| 2,064,774 | Wheeler | Dec. 15, 1936 |
| 2,067,443 | Gewertz | Jan. 12, 1937 |
| 2,301,023 | Darlington | Nov. 3, 1942 |
| 2,920,323 | Dunson | Jan. 5, 1960 |
| 2,932,804 | Matson | Apr. 12, 1960 |